(12) United States Patent
Brierly

(10) Patent No.: US 10,126,160 B2
(45) Date of Patent: Nov. 13, 2018

(54) METHOD AND VEHICLE WITH ARRANGEMENT FOR ESTIMATING MASS OF THE VEHICLE

(71) Applicant: VOLVO TRUCK CORPORATION, Göteborg (SE)

(72) Inventor: R. Bruce Brierly, Middletown, MD (US)

(73) Assignee: Volvo Truck Corporation, Göteborg (SE)

( * ) Notice: Subject to any disclaimer, the term of this patent is extended or adjusted under 35 U.S.C. 154(b) by 182 days.

(21) Appl. No.: 15/037,586

(22) PCT Filed: Dec. 19, 2013

(86) PCT No.: PCT/IB2013/003221
§ 371 (c)(1),
(2) Date: May 18, 2016

(87) PCT Pub. No.: WO2015/092476
PCT Pub. Date: Jun. 25, 2015

(65) Prior Publication Data
US 2016/0298999 A1 Oct. 13, 2016

(51) Int. Cl.
G01G 19/08 (2006.01)

(52) U.S. Cl.
CPC ............... *G01G 19/086* (2013.01)

(58) Field of Classification Search
USPC ............................................. 701/1, 33.4, 56
See application file for complete search history.

(56) References Cited

U.S. PATENT DOCUMENTS

| 4,548,079 A | 10/1985 | Klatt | |
|---|---|---|---|
| 4,941,365 A | 7/1990 | Reiner et al. | |
| 2006/0149424 A1* | 7/2006 | Hecker | B60T 8/172 701/1 |
| 2011/0066322 A1* | 3/2011 | Karlsson | B60T 8/172 701/33.4 |
| 2014/0172253 A1* | 6/2014 | Palmer | B60W 10/11 701/56 |

OTHER PUBLICATIONS

International Search Report (dated Sep. 15, 2014) for corresponding International App. PCT/IB2013/003221.

* cited by examiner

Primary Examiner — Mohamed Charioui
(74) Attorney, Agent, or Firm — WRB-IP LLP

(57) ABSTRACT

A method and vehicle arrangement are provided for estimating a mass of a vehicle. The method and arrangement obtain a plurality of mass estimates under different operating conditions using law of motion equations, then supplies those mass estimates to a Kalman filter to improve reliability of a final mass estimate. The mass estimate can be refined by inputting subsequent mass estimates to the Kalman filter.

14 Claims, 2 Drawing Sheets

METHOD AND VEHICLE WITH ARRANGEMENT FOR ESTIMATING MASS OF THE VEHICLE

BACKGROUND AND SUMMARY

It is useful to know the mass of a vehicle for various purposes. For example, the mass of the vehicle will impact how long it will take the vehicle to stop if a particular braking force is applied. This is particularly important in vehicles such as over-the-road trucks that can perform very differently when fully loaded, partially loaded, or unloaded. The mass of the vehicle is important for purposes of determining the correct amount of power to be provided by an engine under different load conditions. For example, an excessive error with respect to the mass of the vehicle can result in the vehicle either being sluggish or overpowered and not producing desired fuel efficiency. It is not always practical to weigh a loaded, vehicle to determine its actual mass.

It is desirable to provide a convenient and accurate method and arrangement for estimating the mass of a vehicle.

In accordance with an aspect of the invention, a method of estimating vehicle mass (m) comprises determining acceleration of the vehicle over a first period (A1) when a first force (F1) from an engine is applied to wheels of the vehicle, determining acceleration of the vehicle over a second period (A2) when a second force (F2) from the engine is applied to the vehicle wheels, estimating a first value of vehicle mass (m0) from an equation where:

$$m0 = dF/dA$$

wherein, $$dF = F2 - F1$$

$$dA = A2 - A1,$$

estimating a second value of vehicle mass (m1) during the first period and a third value of vehicle mass (m2) by approximating values of a first resistance parameter (R1) during the first period and a second resistance parameter (R2) during the second period, wherein:

$$R1 = \{-m0*A1 + F1 - \tfrac{1}{2}*\delta*a*Cd*V1^2\}/(m0)$$

$$R2 = \{-m0*A2 + F2 - \tfrac{1}{2}*\delta*a*Cd*V2^2\}/(m0)$$

wherein:
$\delta$=air density
Cd=coefficient of drag on the vehicle
a=frontal area of vehicle
V1=average vehicle velocity during, the first period
V2=average vehicle velocity during the second period
R1=a first resistance parameter during the first period
R2=a second resistance parameter during the second period,
and solving for m1 and m2 via the equations:

$$m1 = \{F1 - \tfrac{1}{2}*\delta*a*Cd*V1^2\}/(A1+R2)$$

$$m2 = \{F2 - \tfrac{1}{2}*\delta*a*Cd*V2^2\}/(A2+R1),$$

and estimating in using values including at least m0, m1, and m2.

In accordance with another aspect of the present invention, a vehicle comprising an arrangement for estimating a mass (m) of the vehicle comprises an engine and wheels, the engine being arranged to apply force to the wheels of the vehicle, a speedometer arranged to measure speed of the vehicle and provide a speedometer signal corresponding to the measured speed, and a control unit arranged to receive the speedometer signal and one or more signals from the engine and to calculate force applied to the wheels of the vehicle as a function of the one or more engine signals. The control unit is arranged to determine acceleration of the vehicle over a first period (A1) when a first force (F1) from an engine is applied to wheels of the vehicle, determine acceleration of the vehicle over a second period (A2) when a second force (F2) from the engine is applied to the vehicle wheels, estimate a first value of vehicle mass (m0) from an equation where:

$$m0 = dF/dA$$

wherein, $$dF = F2 - F1$$

$$dA = A2 - A1,$$

estimate a second value of vehicle mass (m1) during the first period and a third value, of vehicle mass (m2) by approximating values of a first resistance parameter (R1) during the first period and a second resistance parameter (R2) during the second period, wherein:

$$R1 = \{-m0*A1 + F1 - \tfrac{1}{2}*\delta*a*Cd*V1^2\}/(m0)$$

$$R2 = \{-m0*A2 + F2 - \tfrac{1}{2}*\delta*a*Cd*V2^2\}/(m0)$$

wherein:
$\delta$=air density
Cd=coefficient of drag on the vehicle
a=frontal area of vehicle
V1=average vehicle velocity during the first period
V2=average vehicle velocity during the second period
R1=a first resistance parameter during the first period
R2=a second resistance parameter during the second period, and
solving for m1 and m2 via the equations:

$$m1 = \{F1 - \tfrac{1}{2}*\delta*a*Cd*V1^2\}/(A1+R2)$$

$$m2 = \{F2 - \tfrac{1}{2}*\delta*a*Cd*v2^2\}/(A2+R1), \text{ and}$$

estimate in using values including at least m0, m1, and m2.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
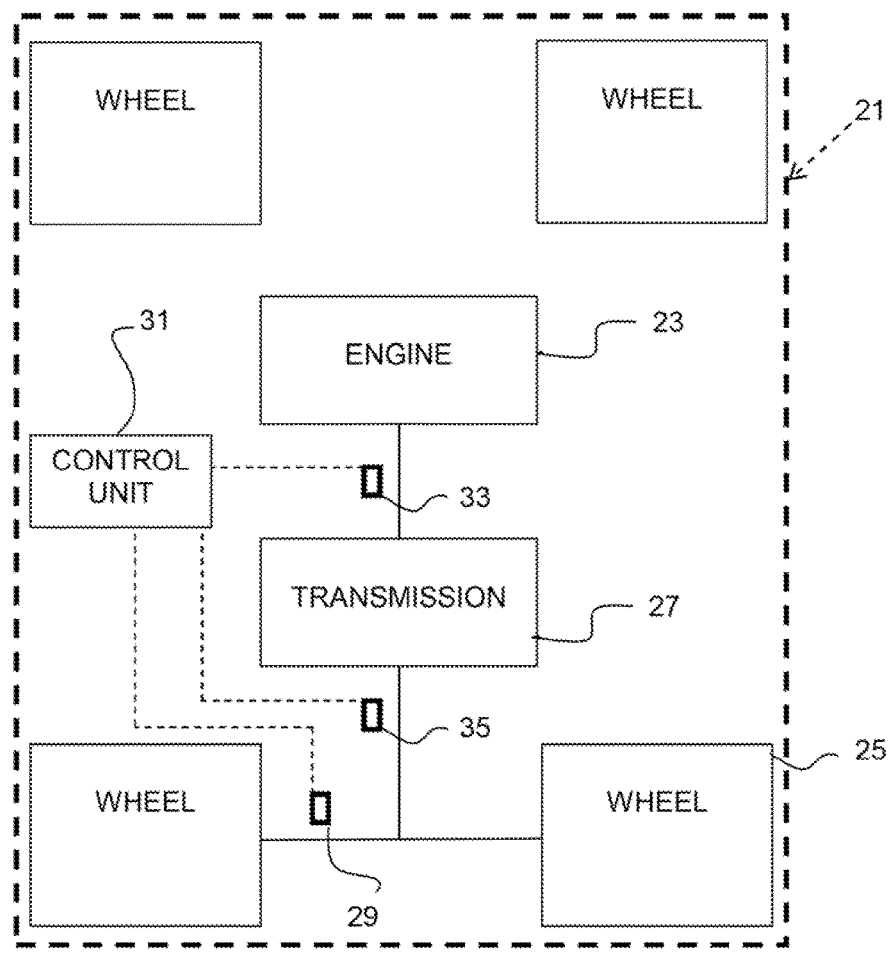
FIG. 1 is a schematic view of a vehicle according to an aspect of the present invention.

A vehicle 21 comprising an arrangement for estimating a mass (m) of the vehicle is shown in FIG. 1. The vehicle 21 comprises an engine 23 and wheels 25, the engine being arranged to apply force to the wheels of the vehicle through conventional means such as a transmission 27. The vehicle 21 further comprises a speedometer 29 arranged to measure speed of the vehicle and provide a speedometer signal corresponding to the speed.

A control unit 31 is provided and can comprise a one or a variety of suitable structures, such as an Engine Control Unit (ECU) and/or other engine controller specially adapted, i.e., arranged to perform steps associated with the present invention. The control unit 31 is arranged to receive the speedometer signal and one or more signals from the engine and to calculate force applied to the wheels of the vehicle as a function of the one or more engine signals. Typically, force (thrust) applied to the wheels is determined using conventional techniques. For example, engine torque is typically a mapped value. The map of engine torque is ordinarily created dining the development of the engine and is ordinarily a core measurement for most other internal engine functions. An engine speed sensor 33 and transmission output shaft speed sensor 35 provide, respectively, engine speed and transmission output shaft speed signals to the control unit. The control unit 31 can be provided with a scaling factor which can be used to determine the factor for converting the transmission output shaft speed to vehicle speed, which is ordinarily essentially the differential ratio and the tire size (revolutions per mile). From that, one can calculate the tire diameter. From this, force from the engine applied to the vehicle wheels equals engine torque×transmission ratio×carrier ratio/tire radius.

The control unit 31 is arranged to determine acceleration (A1) of the vehicle 21 over a first period when a first force (F1) from an engine is applied to wheels of the vehicle, and determine acceleration (A2) of the vehicle over a second period when a second force (F2) from the engine is applied to the vehicle wheels. "Acceleration" will be understood to refer to both acceleration and deceleration, except where otherwise indicated. In each instance, the control unit can determine acceleration by dividing the velocity of the vehicle at the start of the period of measurement minus the velocity of the vehicle at the end of the period of measurement by the time of the period of measurement. The control unit 31 can determine average vehicle velocity V1 and V2 during the first and second periods, as well.

Values of vehicle mass are estimated in several ways using the law of motion equations:

$$F = m*A \qquad (1)$$

$$dF = m*dA \qquad (2)$$

where:
F=force
m=mass
A=acceleration
dF=change in force
dA=change in acceleration For a vehicle traveling over a road, law of motion equation (2) can be solved for m as follows:

$$m0 = dF/dA \qquad (3)$$

wherein, $dF=F2-F1=$(Force at Wheels during second period)−(Force at Wheels during first period)

$dA=A2-A1=$(Acceleration over second period)−(Acceleration over first period)

Further, law of motion equation (1) can be solved for in as follows:

$$m*A = F - \tfrac{1}{2}*\delta*a*Cd*V^2 - Cr*m*g*\cos\Theta - m*g*\sin\Theta \qquad (4)$$

where
δ=air density
Cd=coefficient of drag on the vehicle
a=frontal area of vehicle
V=average vehicle velocity during the period
Cr=vehicle rolling resistance
g=force of gravity (normally 9/8 m/s$^2$
Θ=road grade during the period The portion of equation (4) relating to air resistance is expressed as $\tfrac{1}{2}*\delta*Area*Cd*V^2$. The portion relating to rolling resistance is expressed as $Cr*m*g*\cos\Theta$. The portion relating to the force of gravity on the vehicle as it goes up or down hill is expressed as $m*g*\sin\Theta$.

In equation (4), an density δ can be determined from sensors (not shown) providing data regarding ambient pressure and ambient temperature. Such sensors are ordinarily already on a vehicle. It is reasonable to expect Cr and g to be substantially constant during movement. Cd can be estimated using reasonable values for the particular vehicle. For example, values typical of an over-the-highway truck for Cd will typically be around 030 to 0.7.

A resistance parameter (R) is defined as:

$$R = (Cr*\cos\Theta + \sin\Theta)*g \qquad (5)$$

The law of motion equation (4) is determined for the first and second periods, yielding the following equations:

$$m1*A1 = F1 - \tfrac{1}{2}*\delta*a*Cd*V1^2 - Cr*m1*g*\cos\Theta1 - m1*g*\sin\Theta1 \qquad (6)$$

$$m2*A2 = F2 - \tfrac{1}{2}*\delta*a*Cd*V2^2 - Cr*m2*g*\cos\Theta2 - m2*g*\sin\Theta2 \qquad (7)$$

Substituting resistance parameters R1 and R2 in equations (6) and (7) yields the following equations from which a second value of vehicle mass (m1)) during the first period and a second value of vehicle mass (m2) during the second period can be estimated:

$$m1 = \{F1 - \tfrac{1}{2}*\delta*a*Cd*V1^2\}/(A1+R1) \qquad (8)$$

$$m2 = \{F2 - \tfrac{1}{2}*\delta*a*Cd*V2^2\}/(A2+R2) \qquad (9)$$

where:
V1=average vehicle velocity during the first period
V2=average vehicle velocity during the second period
R1=a first resistance parameter during the first period
R2=a second resistance parameter during the second period,
wherein:

$$R1 = (Cr*\cos\Theta1 + \sin\Theta1)*g \qquad (10)$$

$$R2 = (Cr*\cos\Theta2 + \sin\Theta2)*g \qquad (11)$$

wherein:
Θ1=road grade during first period
Θ2=road grade during second period

In addition, solving equations (8) and (9) for R1 and R2, respectively, yields:

$$R1 = \{-m1*A1 + F1 - \tfrac{1}{2}*\delta*a*Cd*V1^2\}/(m1) \qquad (12)$$

$$R2 = \{-m2*A2 + F1 - \tfrac{1}{2}*\delta*a*Cd*V2^2\}/(m2) \qquad (13)$$

R1 and R2 can be approximated by replacing m1 and m2 in equations (12) and (13) with m0, which is useful as an initial estimate of mass, to yield:

$$R1 = \{-m0*A1 + F1 - \tfrac{1}{2}*\delta*a*Cd*V1^2\}/(m0) \qquad (14)$$

$$R2 = \{-m0*A2 + F2 - \tfrac{1}{2}*\delta*a*Cd*V2^2\}/(m0) \qquad (15)$$

R1 and R2 as calculated in equations (14) and (15) can then be inserted into equations (8) and (9) to obtain values for m1 and m2. While it may be possible to determine A and Cd for passenger vehicles with a reasonable degree of confidence that those values will be consistent over a given production, that is because those values tend not to change substantially from vehicle to vehicle. With larger vehicles such as over-the-road trucks, A and Cd can change a couple times a day for each vehicle. For example, A and Cd will be different for a flatbed trailer versus a smooth sided van trailer versus a ribbed sided trailer. A tractor may pull the same trailer for the life of the truck, or it may pull a couple different trailers per day. In addition, there are myriad different tractor and trailer tires, and selection of on versus another will impact Cr.

While not wishing to be bound by theory, in the calculation of R1 and R2 using equations (14) and (15), the inventor submits that A, CA, and ambient pressure and temperature (and, thus, $\delta$) in equations (14) and (15) will remain constant for purposes of performing the mass estimation according to the present invention as these values are unlikely to change while driving, at least over short periods of time.

The road grade $\Theta$ will, however, change often. Some vehicles have grade sensors, and others do not. While it is preferable that the methods described here be performed when changes in $\Theta$ are small, changes can be significant enough to impact the calculation of m. The use of the resistance parameter R concept is considered to be a useful way of flagging when variables such as the grade has changed during the calculation, and if the force or acceleration portions of one of the calculations is otherwise faulty. For example, if a vehicle hits a bump or is subjected to a sudden, strong head wind, these facts can throw off the calculations of m0 in equation (3).

If the change in forces is captured just moments apart, when there is a small change in velocity (hence no change in aero or friction drag) and there is little possibility for a large change in road grade, then the change in forces is almost completely from the change in engine torque and/or torque multiplication from a gear change. Thus, many of the variables in equations (8) and (9) cancel, out or substantially cancel out and are not ordinarily of importance in equation (3).

In ideal circumstances, R1 and R2 in equations (8) and (9) are equal to each other. However, due to changes in grade and other sources of error in measurements and estimates, R1 and R2 will ordinarily differ. Wind drag and drag from rolling resistance of the tires should be the same or close during each period of measurement, however noise results from factors such as bumps in the road, changes in road grade, errors in engine torque, measurements of velocity and acceleration determinations. The worse the quality of data input to equations (8) and (9), the greater the difference between R1 and R2. The inventor has recognized that an indication of the quality of the data can be obtained by performing the method as described above except the values of R1 and R2 are switched in equations (8) and (9), yielding the following equations for calculating m1 and m2:

$$m1 = \{F1 - \frac{1}{2} * \delta * a * Cd * V1^2\}/(A1 + R2) \quad (16)$$

$$m2 = \{F2 - \frac{1}{2} * \delta * a * Cd * V2^2\}/(A2 - R1) \quad (17)$$

Inserting R1 and R2 into equations (9) and (8), respectively, acts as a check to determine if those variables truly did cancel out, or if there was noise or disturbances in the first or second calculations which would result in an error in the calculation of m1 or m2 that would not have otherwise been captured.

Using values including at least m0, m1 and m2 as calculated from equations (3), (16), and (17), the value of mass m can be estimated. The value of mass m may, for example, be estimated as an average of m0, m1, and m2.

Preferably, the control unit 31 is arranged to estimate m using an average of m0, m1, m2, and a standard deviation of m0, m1, and m2 as inputs to a Kalman filter. The square of the standard deviation is the covariance for the Kalman filter. The control unit 31 may further be arranged to perform the steps of estimating m0, m1, and m2 at additional time periods to obtain an average of the estimated mass and the standard deviation of the estimates as further inputs to the Kalman filter. Ordinarily many successive estimates of average vehicle mass and standard deviation of the estimates will be additional inputs to the Kalman filter.

The standard deviation can be compared to a table lookup. At certain road speeds or transmission gear ratios, the data calculated by dF/dA (m0 equation (3)) tends to be cleaner or noisier. Test mass estimates mt during a test period can be obtained from the equation mt=dF/dA, and a standard deviation of all of the mt calculations over the test period can be plotted versus road speed, gear ratio, etc. The plotted standard deviation can then be compared to the standard deviation of the calculated mass values m0, m1, and m2 obtained using equations (3), (16), and (17) for a current sample. The greater of the two standard deviations (plotted over test period or calculated from current sample) can then be used as the standard deviation that is input to the Kalman filter with mass values m0, m1, and m2 for the current sample. Using the greater of the two standard deviations means that the Kalman filter will put less reliance on individual mass estimates that differ significantly from a majority of the mass estimates.

The values of m0, m1, and m2 can further be combined with other data to calculate the average and standard deviation of a greater population of samples. For example, m0, m1, m2, and the mass estimate me from another system (such as mass estimates obtained by converting air bag pressure measurements from air bag suspension arrangements on one or more axles to axle loading, or mass estimates from load sensors that are provided to determine if loading on an axle is over a legal limit) can be combined for an average and standard deviation to be placed in a Kalman filter. Further, previous mass estimates produced by the Kalman filter can be combined with m0, m1, and m2 to obtain a new standard deviation and average value to be input into the Kalman filter.

It is presently believed to be preferred to estimate the mass in of the vehicle 21 under particular conditions during which there are substantial changes in the force from the engine being applied to the wheels of vehicle. One condition occurs when the first period during which data for F1 and A1 are obtained is during a gear shift when no force from the engine is applied to wheels of the vehicle and when the second period for which data F2 and A2 are obtained is after the gear shift when force from the engine is applied the wheels of the vehicle. In the circumstances where F1 and A1 are obtained during a gear shift and F2 and A2 are obtained after the gear shift, forces from the engine will be zero and, though the total forces on the vehicle will include the aerodynamic, gravitational, and friction drag forces, aerodynamic, gravitational, and friction drag forces should be nearly identical to the same forces in during the first period and the second period. The greater the difference between the aerodynamic, gravitational, and friction drag forces between the first and second periods, the greater the standard deviation of m0, m1, and m2. The higher the standard deviation, the longer it takes the Kalman filter to converge on a mass estimate. It is desirable for the filter to converge quickly on a good mass estimate. If the aerodynamic, gravitational, and frictional drag forces are all the same or close, it is more likely that the data will be clean and the filter will converge faster on a good mass estimate.

A determination that the transmission 27 is out of gear can be made when the engine speed measured by the engine speed sensor 33 does not match the transmission output shaft speed measured by the transmission output shaft speed sensor by a known ratio (transmission ratio). Vehicle speed measured by the speedometer 29 can then be recorded at the point that it is determined that the transmission 27 is out of gear. The transmission 27 is determined to be in gear again when the engine speed matches the transmission output shaft speed by a known ratio. At that point vehicle speed measured by the speedometer 29 is stopped, if it has not already been stopped. Data can be recorded to calculate the vehicle acceleration over a very small period of time, and may be on the order of milliseconds. Alternatively or in addition, a switch or series of switches in the transmission can indicate when the transmission is in neutral. To determine A1 and F1 after a gear shift has been completed, if there was enough time to get a valid out-of-gear acceleration A1 value, a timer can be started. The engine torque×gear ratio×axle ratio× factor based on tire size has to result in a force at the wheels greater than a threshold before the timer expires. It is not believed to be useful to measure acceleration if the force F2 is too small. Once the force F2 is high enough, vehicle speed is measured over the period of about 1 second to determine the acceleration A2 within that second. If the acceleration is too low, the data can be discarded.

An alternative condition during circumstances in which there is a substantial change in force from the engine being applied to the wheels of the vehicle. A particularly useful circumstance occurs when the first period is during coasting when an accelerator of the vehicle is not depressed and the second period is when the accelerator is fully depressed, or vice versa. Expressed differently, the first period can be during, application of modest force, and the second period can be during application of high three, or vice versa. Inputs obtained during each condition can be input into the Kalman filter to obtain improved data quality.

Figure 2:
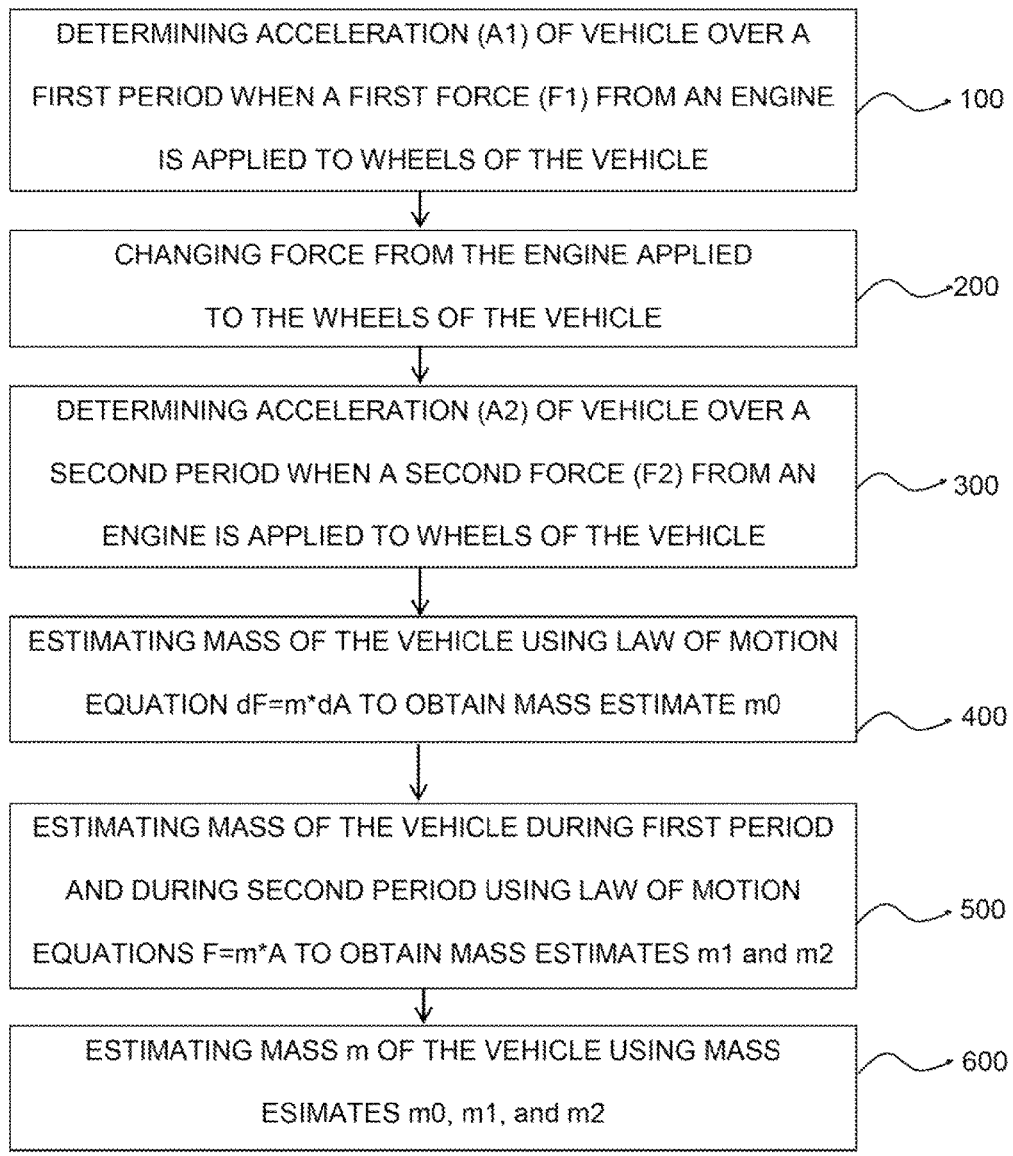
FIG. 2 is a flow chart showing steps in a method according to an aspect of the present invention.

In a method of estimating vehicle 21 mass in as shown in FIG. 2, at step 100, acceleration A1 of the vehicle over the first period is measured when the first force F1 from the engine 23 is applied to wheels 25 of the vehicle, and after changing the amount of force from the engine applied to the wheels of the vehicle at step 200, acceleration A2 of the vehicle over the second period is measured at step 300 when the second force F2 from the engine is applied to the vehicle wheels. At step 400, the first value of vehicle mass m0 is estimated from equation (3), and, at step 500, the second value of vehicle mass m1 during the first period and the third value of vehicle mass m2 during the second period are estimated from equations (8) and (9). The value of in is then estimated at step 600 using values including at least m0, m1, and m2.

The value of mass in may then be estimated, for example, as an average of m0, m1, and m2. Preferably, m is estimated using m0, m1, m2, and a standard deviation of m0, m1, and m2 as inputs to a Kalman filter. The steps of determining acceleration of the vehicle over a first period 1 when the first force H from the engine is applied to wheels of the vehicle, and determining acceleration A2 of the vehicle over the second period when the second force F2 from the engine is applied to the vehicle wheels at at least one interval and ordinarily many repeated intervals to obtain at least one estimate and ordinarily many successive estimates of vehicle mass (mn1, mn2, and mn3), and to estimate in by inputting mn1, mn2, and mn3 and a standard deviation of mn1, mn2, and mn3 into the Kalman filter.

Upon estimation of the mass of the vehicle, the estimated mass value can be applied in a variety of ways. In one application, the estimated mass is used to determine an amount of force needed to brake the vehicle from a current speed to a desired speed in a certain distance or time. In another application, the estimated mass is used to determine an engine speed and torque for optimal efficiency.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method of estimating vehicle mass (m), comprising:
   determining acceleration of the vehicle over a first period (A1) when a first force (F1) from an engine is applied to wheels of the vehicle;
   determining acceleration of the vehicle over a second period (A2) when a second force (F2) from the engine is applied to the vehicle wheels;
   estimating, using a control unit, a first value of vehicle mass (m0) from an equation where:

$$m0 = dF/dA$$

wherein, $$dF = F2 - F1$$

$$dA = A2 - A1,$$

estimating, using the control unit, a second value of vehicle mass (m1) during the first period and a third value of vehicle mass (m2) by:
   approximating values of a first resistance parameter (R1) during the first period and a second resistance parameter (R2) during the second period, wherein:

$$R1 = \{-m0*A1 + F1 - \tfrac{1}{2}*\delta*a*Cd*V1^2\}/(m0)$$

$$R2 = \{-m0*A2 + F2 - \tfrac{1}{2}*\delta*a*Cd*V2^2\}/(m0)$$

wherein:
   S=air density
   Cd=coefficient of drag on the vehicle
   a=frontal area of vehicle
   V1=average vehicle velocity during the first period
   V2=average vehicle velocity during the second period
   R1=a first resistance parameter during the first period
   R2=a second resistance parameter during the second period,
   and
   solving for m1 and m2 via the equations:

$$m1 = \{F1 - \tfrac{1}{2}*\delta*a*Cd*V1^2\}/(A1 + R2)$$

$$m2 = \{F2 - \tfrac{1}{2}*\delta*a*Cd*V2^2\}/(A2 + R1);$$

estimating, using the control unit, m using values including at least m0, m1, and m2; and controlling, via the control unit, at least one of brakes of the vehicle to exert a braking force on the vehicle and speed and torque of an engine of the vehicle to exert a driving force on the vehicle as a function of m.

2. The method as set forth in claim 1, comprising estimating m using m0, m1, m2, and a standard deviation of m0, m1, and m2 as inputs to a Kalman filter.

3. The method as set forth in claim 2, comprising performing the steps of determining acceleration of the vehicle over a first period (A1) when a first force (F1) from an engine is applied to wheels of the vehicle, and determining acceleration of the vehicle over a second period (A2) when a second force (F2) from the engine is applied to the vehicle wheels at at least one repeated interval to obtain at least one successive estimate of vehicle mass (mn1, mn2, and mn3), and estimating m by inputting mn1, mn2, and mn3 and a standard deviation of mn1, mn2, and mn3 into the Kalman filter.

4. The method as set forth in claim 1, wherein the first period is during a gear shift when no force from the engine is applied to wheels of the vehicle and the second period is after the gear shift when force from the engine is applied the wheels of the vehicle.

5. The method as set forth in claim 1, wherein the first period is during coasting when an accelerator of the vehicle is not depressed and the second period is when the accelerator is fully depressed.

6. The method as set forth in claim 1, comprising
obtaining a plurality of test estimates of vehicle mass mt from an equation where:

$$mt = dF/dA$$

and determining a test period standard deviation;
determining a current sample standard deviation of m0, m1, and m2;
estimating m by inputting m0, m1, and m2 and a larger of the test period standard deviation and the current sample standard deviation as inputs to a Kalman filter.

7. The method as set forth in claim 1, comprising
obtaining an estimate of mass me of the vehicle from another system; and
estimating m using me, m0, m1, m2, and a standard deviation of me, m0, m1, and m2 as inputs to a Kalman filter.

8. A vehicle comprising an arrangement for estimating a mass (m) of the vehicle, comprising:
an engine and wheels, the engine being arranged to apply force to the wheels of the vehicle;
a speedometer arranged to measure speed of the vehicle and provide a speedometer signal corresponding to the measured speed; and
a control unit arranged to receive the speedometer signal and one or more signals from the engine and to calculate force applied to the wheels of the vehicle as a function of the one or more engine signals, the control unit being arranged to
determine acceleration of the vehicle over a first period (A1) when a first force (F1) from an engine is applied to wheels of the vehicle;
determine acceleration of the vehicle over a second period (A2) when a second force (F2) from the engine is applied to the vehicle wheels;
estimate a first value of vehicle mass (m0) from an equation where:

$$m0 = dF/dA$$

wherein, $$dF = F2 - F1$$

$$dA = A2 - A1;$$

estimate a second value of vehicle mass (m1) during the first period and a third value of vehicle mass (m2) by:
approximating values of a first resistance parameter (R1) during the first period and a second resistance parameter (R2) during the second period, wherein:

$$R1 = \{-m0*A1 + F1 - \tfrac{1}{2}*\delta*a*Cd*V1^2\}/(m0)$$

$$R2 = \{-m0*A2 + F2 - \tfrac{1}{2}*\delta*a*Cd*V2^2\}/(m0)$$

wherein:
$\delta$ = air density
Cd = coefficient of drag on the vehicle
a = frontal area of vehicle
V1 = average vehicle velocity during the first period
V2 = average vehicle velocity during the second period
R1 = a first resistance parameter during the first period
R2 = a second resistance parameter during the second period,
and
solving for m1 and m2 via the equations:

$$m1 = \{F1 - \tfrac{1}{2}*\delta*a*Cd*V1^2\}/(A1 + R2)$$

$$m2 = \{F2 - \tfrac{1}{2}*\delta*a*Cd*V2^2\}/(A2 + R1); \text{ and}$$

estimate m using values including at least m0, m1, and m2; and
control, via the control unit, at least one of brakes of the vehicle to exert a braking force on the vehicle and speed and torque of an engine of the vehicle to exert a driving force on the vehicle as a function of m.

9. The vehicle as set forth in claim 8, wherein the control unit is arranged to estimate m using m0, m1, m2, and a standard deviation of m0, m1, and m2 as inputs to a Kalman filter.

10. The vehicle as set forth in claim 9, wherein the control unit is arranged to perform the steps of determining acceleration of the vehicle over a first period (A1) when a first force (F1) from an engine is applied to wheels of the vehicle, and to determine acceleration of the vehicle over a second period (A2) when a second force (F2) from the engine is applied to the vehicle wheels at at least one repeated interval to obtain at least one successive estimate of vehicle mass (mn1, mn2, and mn3), and to estimate m by inputting mn1, mn2, and mn3 and a standard deviation of mn1, mn2, and mn3 into the Kalman filter.

11. The vehicle as set forth in claim 8, wherein the first period is during a gear shift when no force from the engine is applied to wheels of the vehicle and the second period is after the gear shift when force from the engine is applied the wheels of the vehicle.

12. The vehicle as set forth in claim 8, wherein the first period is during coasting when an accelerator of the vehicle is not depressed and the second period is when the accelerator is fully depressed.

13. The vehicle as set forth in claim 8, wherein the control unit is arranged to:
obtain a plurality of test estimates of vehicle mass mt from an equation where:

$$mt = dF/dA$$

and determine a test period standard deviation;
determining a current sample standard deviation of m0, m1, and m2; and estimate m by inputting m0, m1, and m2 and a larger of the test period standard deviation and the current sample standard deviation as inputs to a Kalman filter.

14. The vehicle as set forth in claim 8, comprising another system for providing an estimate of mass me of the vehicle, wherein the control unit is arranged to estimating m using me, m0, m1, m2, and a standard deviation of me, m0, m1, and m2 as inputs to a Kalman filter.

* * * * *